United States Patent Office 3,337,620
Patented Aug. 22, 1967

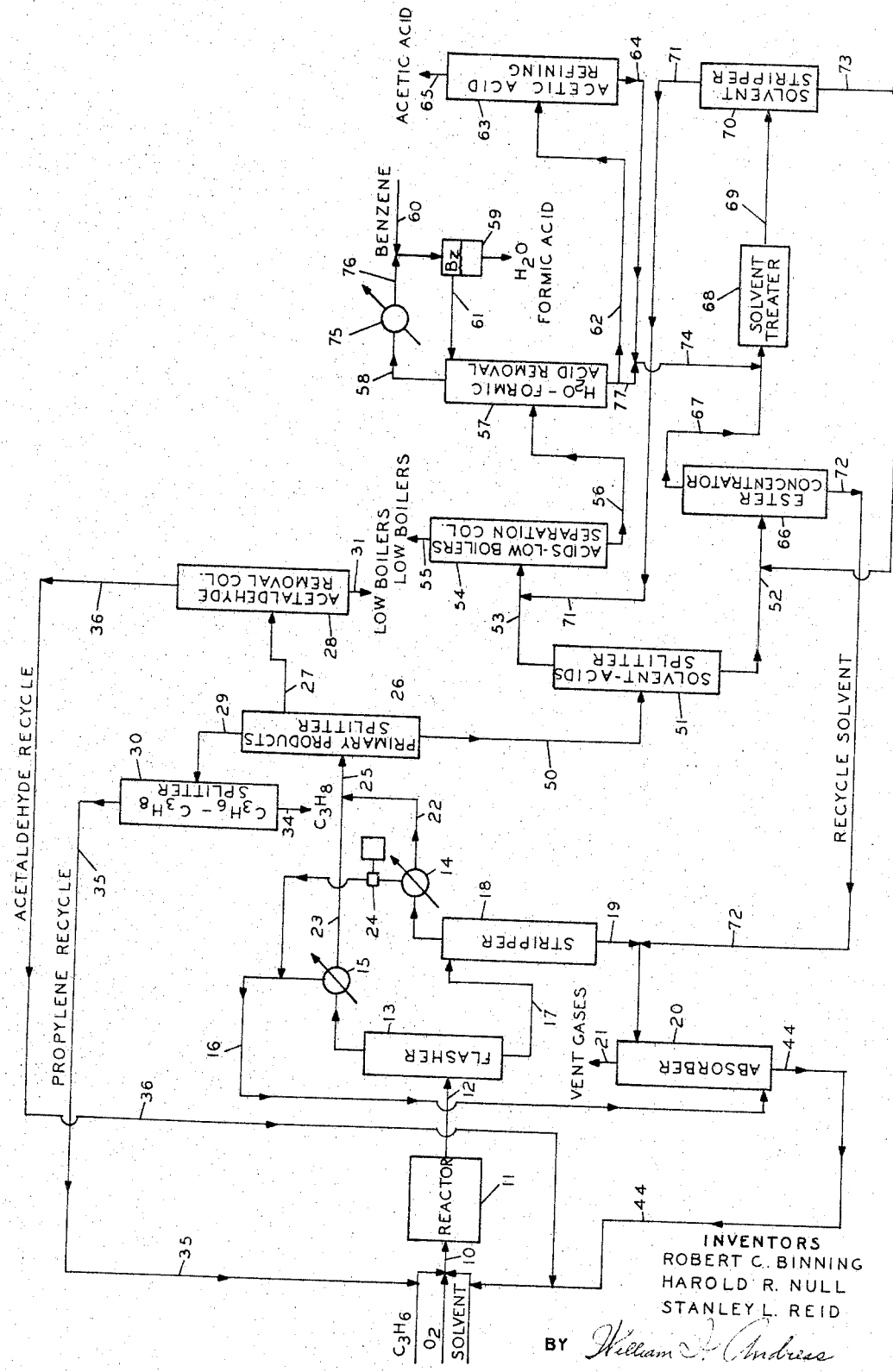

3,337,620
PREPARATION AND RECOVERY OF
ACETIC ACID
Robert C. Binning, St. Louis, Harold R. Null, Florissant, and Stanley L. Reid, St. Louis, Mo., assignors to Monsanto Company, a corporation of Delaware
Filed Feb. 12, 1964, Ser. No. 344,222
5 Claims. (Cl. 260—533)

The present invention relates to the production and recovery of acetic acid.

In broad aspect the present invention relates to the oxidation of propylene with molecular oxygen to produce acetic acid.

One aspect of the present invention involves conducting the said oxidation in a liquid phase comprising fully esterified polyacyl esters of polyols more fully described hereinafter.

Another aspect of this invention concerns a novel recovery system for the product acetic acid.

Still another aspect of this invention relates to a non-catalytic olefin oxidation system to produce and recover acetic acid.

There are numerous methods described in the prior art for producing and recovering carboxylic acids. Illustrative prior art methods for producing such acids include various carbonylation procedures, notably the reaction of olefins with carbon monoxide and water. For example, in U.S. Patent 2,831,877 an olefin and carbon monoxide are reacted in an anhydrous medium in the presence of a catalyst such as concentrated sulfuric acid or anhydrous hydrogen fluoride or chlorosulfonic acid alone or with boron trifluoride. The reaction mixture is then hydrated to produce the resultant carboxylic acid. Variations of the above process include the use of different catalysts, e.g., monohydroxyfluoboric acid alone or mixed with phosphoric or sulfuric acids as in U.S. Patent 2,876,241 or solid phosphoric acid as described in U.S. Patent 3,036,124.

Another patent (U.S. Patent 2,913,489) describes the reaction of alcohols and/or ethers with carbon monoxide to produce carboxylic acids.

Still another prior art process (U.S. Patent 2,000,878) describes the reaction of propylene with an aqueous alkali metal hydroxide in water to produce alkali metal acetates which may be acidified with concentrated $H_2SO_4$ or HCl to recover acetic acid. This process utilizes temperatures in the range of from 300–420° C. and basic aluminum compounds as catalysts, e.g., aluminum oxide or hydroxide.

Other prior art methods rely upon the use of acetylene as a starting material to produce acetic acid. For example, in U.S. Patent 1,128,780, acetylene is reacted with a peroxidizing agent, e.g., hydrogen peroxide or persulfuric acid in the presence of mercury or a mercury compound. Another patent (U.S. Patent 1,174,250) describes a process for the reaction of acetylene, oxygen and water in the presence of a mercury compound, an organic acid such as acetic acid and an inorganic acid, e.g., phosphoric acid.

Other methods described in the prior art for producing acetic acid involve the oxidation of paraffins with molecular oxygen in a solvent such as carbon tetrachloride or benzene containing an oxidation catalyst and initiator (U.S. Patent 2,265,948). Another paraffin oxidation process describes a non-catalytic oxidation, but relies upon a critical ratio of throughput rates of oxygen, paraffin and a distillate fraction of reaction products boiling below 99° C. in the presence of water (U.S. Patent 2,825,740).

Still other methods for producing acetic acid involve the oxidation of olefins with molecular oxygen in the presence of various catalysts. For example, in one process (U.S. Patent 3,057,915) ethylene is oxidized with oxygen in the presence of water vapor and a catalyst comprising a carrier, a salt of a noble metal, cupric chloride and an oxide of a metal such as iron, manganese and/or cobalt.

Most of the prior art processes heretofore described suffer one or more disadvantages in that they require oxidation catalysts, initiators, critical reactant feed rates, expensive or dangerous starting materials, unduly high reaction temperatures or difficult separation techniques.

It is, therefore, an object of the present invention to provide a liquid phase propylene oxidation process for the production of and recovery of acetic acid.

An object of this invention is to provide a non-catalytic direct oxidation of propylene with molecular oxygen to produce acetic acid in a liquid phase comprising fully esterified polyacyl esters of polyols.

Another object of the present invention is to provide a process for the production and recovery of acetic acid wherein solvent mechanical losses can be made up from products of the oxidation.

Still another object of this invention is to provide a process for producing acetic acid which does not utilize expensive, unsafe or hard-to-obtain starting materials, is simple, economical and practical.

These and other objects of the invention will become more apparent as the description of the invention proceeds.

A schematic flow diagram of the process is shown in the accompanying figure.

The present invention comprises the production of acetic acid by the controlled direct oxidation of propylene with molecular oxygen in the liquid phase and to a novel means of separating and recovering this product.

The liquid phase in which the oxidation occurs comprises solvents which are essentialy chemically indifferent, high boiling with respect to volatile oxidation products and are oxidatively and thermally stable under the condition of the reaction described. Further, the solvents employed in the present invention are highly resistant to attack by free radicals which are generated in the oxidation process. Moreover, the solvents employed in the instant invention are effective in assuaging the deleterious effects of acidic components, especially formic acid and to a lesser degree acetic acid, on commercially valuable non-acidic by-products, e.g., propylene oxide, which are formed in the oxidation of olefins.

Solvents primarily and preferably contemplated herein comprise fully esterified polyacyl esters of polyhydroxyalkanes, polyhydroxycycloalkanes, polyglycols and mixtures thereof. Polyacyl esters contemplated herein contain, generally, from 1 to 18 carbon atoms in each acyl moiety and from 2 to 18 carbon atoms in each alkylene or cycloalkylene moiety. However, best results obtain when the acyl moiety contains from 1 to 6 carbon atoms and the alkylene and cycloalkylene moiety each contains from 2 to 6 carbon atoms. These esters may be readily prepared by methods known to the art. For example, in U.S. Patent 1,534,752 is described a method whereby glycols are reacted with carboxylic acids to produce the corresponding glycol ester. Acid anhydrides may be used in place of the acids.

Representative glycols include straight-chain glycols, such as ethylene glycol, propylene glycol, butylene glycol, pentylene glycol, hexylene glycol, heptylene glycol, octylene glycol, nonylene glycol, decylene glycol, dodecylene glycol, pentadecylene glycol and octadecylene glycol. Branched-chain glycols such as the iso-, primary, secondary and tertiary isomers of the above straight chain glycols are likewise suitable, e.g., isobutylene glycol, primary, secondary, and tertiary amylene glycols, 2-methyl-2,4-pentanediol, 2-ethyl-1,3-hexanediol, 2,3-dimethyl-2,3-butanediol, 2-methyl-2,3-butanediol and 2,3-dimethyl-2,3-dodecanediol. Polyalkylene glycols (polyols) include diethylene glycol, dipropylene glycol, tripropylene glycol, tetrapropylene glycol and dihexylene glycol.

In addition to straight and branched-chain glycols, alicyclic glycols such as 1,2-cyclopentanediol, 1,2-cyclohexanediol, 1-methyl-1,2-cyclohexanediol and the like may be used.

Other suitable hydroxy compounds include polyhydroxy alkanes, such as glycerol, erythritol and pentaerythritol and the like.

Representative carboxylic acids include fatty acids such as formic acid, acetic acid, propionic acid, butyric acid, valeric acid, caproic acid, caprylic acid, lauric acid, palmitic acid, stearic acid, naphthenic acids, such as cyclopentane carboxylic acid, cyclohexane carboxylic acid, and aromatic acids such as benzoic acid and the like.

Representative polyacyl esters include polyacyl esters of polyhydroxy alkanes, such as triacyl esters of glycerol, e.g., glycerol triacetate; tetraacyl esters of erythritol and pentaerythritol, e.g., erythritol tetraacetate and pentaerythritol tetraacetate and the like, and polyacyl esters of polyalkylene glycols (polyglycols), such as diethylene glycol diacetate, dipropylene glycol diacetate, tetraethylene glycol diacetate and the like. These polyacyl ester solvents may be used individually or as mixtures, being compatible with each other. For example, a mixture of varying proportions of a diacyl ester of a hydroxyalkane, such as propylene glycol diacetate, and a polyacyl ester of a polyglycol, such as dipropylene glycol diacetate, may be used. Or, a mixture of a polyacyl ester of a polyglycol, such as dibutylene glycol dibutyrate, and a polyacyl ester of a polyhydroxy alkane, such as glycerol trivalerate, or pentaerythritol tetrapropionate may be used as the solvent in the instant process illustrated in the examples below.

Of particular interest in the present process are the vicinal diacyl esters of alkylene glycols, such as the diformates, diacetates, dipropionates, dibutyrates, divalerates, dicaproates, dicaprylates, dilaurates, dipalmitates and distearates, and mixtures thereof, of the alkylene and polyalkylene glycols recited above. Still more particularly, of greater interest are the diacetates of ethylene and propylene glycols used individually or in admixtures of any proportion.

Polyacyl esters having mixed acyl groups are likewise suitable, e.g., ethylene glycol formate butyrate, propylene glycol acetate propionate, propylene glycol butyrate propionate, butylene glycol acetate caproate, diethylene glycol acetate butyrate, dipropylene glycol propionate caproate, tetraethylene glycol butyrate caprylate, erythritol diacetate dipropionate, pentaerythritol dibutyrate divalerate, glycerol dipropionate butyrate and cyclohexanediol acetate valerate.

Monoacyl esters of polyhydroxyalkanes and polyglycols are unsuitable for use as a reaction medium according to the present process. The same is true of other hydroxy or hydroxylated compounds such as glycerin, glycols, polyglycols and hydroxy carboxylic acids. This is due to the presence of an abundance of reactive hydroxyl groups which are susceptible to autooxidative attack, hence, introduce concomitant oxidation side reactions which compete with the desired direct oxidation of the olefin.

In the preferred mode of operation the polyacyl esters used herein constitute the major proportion of the liquid reaction medium with respect to all other constituents including reactants, oxidation products and by-products dissolved therein. By major is meant that enough solvent is always present to exceed the combined weight of all other constituents. However, it is within the purview of this invention, although a less preferred embodiment, to operate in such manner that the combined weight of all components in the liquid phase other than polyacyl esters exceeds that of the polyacyl ester solvent. For example, a refinery grade hydrocarbon feedstock or a crude hydrocarbon feedstock containing, e.g., 50% by weight of the olefin to be oxidized, e.g., propylene, and 50% by weight of saturated hydrocarbons, e.g., an alkane such as propane, may be used in quantities up to 50% by weight based on the solvent. Upon oxidizing this feedstock, unreacted olefin, alkane and oxygen together with oxidation products including acetic acid, low boilers such as acetaldehyde, propylene oxide, acetone and methyl acetate, and high boilers (components having boiling points higher than that of the polyacyl ester solvent) formed in the reaction and/or recycled to the reactor may constitute as much as 75% by weight of the liquid reaction medium, according to reaction conditions or recycle conditions.

When carrying out the invention according to the less preferred mode of operation, the quantity of polyacyl ester solvent present in the liquid reaction medium should be not less than 25% by weight of said medium in order to advantageously utilize the aforementioned benefits characteristic to these unique olefin oxidation solvents.

In further embodiments of the present invention for producing acetic acid by oxidizing olefins with molecular oxygen in the liquid phase, the polyacyl ester solvents are suitably used in combination with diluents or auxiliary solvents which are high boiling with respect to volatile oxidation products, are relatively chemically indifferent and oxidatively and thermally stable under reaction conditions. Here, too, the polyacyl ester solvents should be utilized in quantities not less than 25% by weight of the liquid reaction medium in order to retain the superior benefits of these polyacyl ester solvents in the present liquid phase olefin oxidation.

Suitable diluents which may be utilized with the polyacyl ester solvents of this invention include, e.g., hydrocarbon solvents such as xylenes, kerosene, biphenyl and the like; halogenated benzenes such as chlorobenzenes, e.g., chlorobenzene and the like; dicarboxylic acid esters such as dialkyl phthalates, oxalates, malonates, succinates, adipates, sebacates, e.g., dibutyl phthalate, dimethyl succinate, dimethyl adipate, dimethyl sebacate, dimethyl oxalate, dimethyl malonate and the like; aromatic ethers such as diaryl ethers, e.g., diphenyl ether; halogenated aryl ethers such as 4,4'-dichlorodiphenyl ether and the like; diaryl sulfoxides, e.g., diphenyl sulfoxide; dialkyl and diaryl sulfones, e.g., dimethyl sulfone and dixylyl sulfone and nitroalkanes, e.g., nitrohexane. While the foregoing have been cited as typical diluents which may be used in combination with the polyacyl ester solvents in this invention, it is to be understood that these are not the only diluents which can be used. In fact, the benefits accruing from the use of these polyacyl esters can be utilized advantageously when substantially any relatively chemically indifferent diluent is combined therewith.

Therefore, the present invention in its broadest use comprehends the oxidation of olefin-containing feedstocks in a liquid reaction medium consisting essentially of at least 25% by weight based on said medium of at least one fully esterified polyacyl ester described above.

In any case, the liquid reaction medium referred to herein is defined as that portion of the total reactor content which is in the liquid phase.

It is therefore apparent that the liquid reaction media contemplated herein possess not only those characteristics described in prior art solvents, viz., they are high boiling with respect to volatile oxidation products under the conditions of reaction, essentially chemically indifferent and oxidatively and thermally stable, but in addition, possess characteristics not described in prior art oxidations, viz., resistance to free radical attack, the ability to reduce and/or eliminate the deleterious effects of acidic components on valuable non-acidic by-products. In addition, due to the facile manner in which the present oxidation proceeds in the described solvents, no oxidation catalysts, promoters, initiators, buffers, neutralizers, polymerization inhibitors, etc. are required as in many prior art processes.

As noted above, no added catalysts are required in the present oxidation process. However, due to the versatility of the above-described solvents in olefin oxidations, the usual oxidation catalysts can be tolerated although usually no significant benefit accrues from their use. For example, metalliferous catalysts such as platinum, selenium, vanadium, iron, nickel, cobalt, cerium, chromium, manganese, silver, cadmium, mercury and their compounds, preferably in the oxide form, etc., may be present in gross form, supported or unsupported, or as finely divided suspensions.

In like manner, since the olefin oxidations according to this invention proceed at a rapid rate after a brief induction period, no initiators or promoters are required, but may be used to shorten or eliminate the brief induction period, after which no additional initiator or promoter need be added.

Suitable initiators include organic peroxides, such as benzoyl peroxide; inorganic peroxides, such as hydrogen and sodium peroxides; peracids, such as peracetic and perbenzoic acids; ketones, such as acetones; ethers, such diethyl ether; and aldehydes, such as acetaldehyde, propionaldehyde and isobutyraldehyde.

Use of the solvents described herein, being free of the necessity to use various additives described in prior art processes, enhances the separation and recovery of acetic acid by the sequence of steps described in detail below.

In carrying out the process of the instant invention, the reaction mixture may be made up in a variety of ways. For example, the olefin and oxygen may be premixed with the solvent and introduced into the reactor, or the olefin may be premixed with the solvent (suitably, up to 50% by weight based on the solvent and, preferably, from 5 to 30% by weight based on the solvent). Preferably, the olefin is premixed with the solvent and the oxygen-containing gas introduced into the olefin-solvent mixture incrementally, or continuously, or the olefin and oxygen-containing gas may be introduced simultaneously through separate or common feedlines into a body of the solvent in a suitable reaction vessel (described below). In one embodiment an olefin and oxygen-containing gas mixture is introduced into the solvent in a continuously stirred tank reactor, under the conditions of temperature and pressure described below. Suitable olefin:oxygen volumetric ratios are within the range of 1:5 to 15:1. Feed rates, generally, may vary from 0.5 to 1500 ft.³/hr., or higher, and will largely depend upon reactor size. The oxygen input is adjusted in such manner as to prevent an excess of oxygen (>1%) in the off-gas or above the reaction mixture. Otherwise, a hazardous concentration of explosive gases is present. Also, if the oxygen (or air) feed rate is too high the olefin will be stripped from the mixture, thus reducing the concentration of olefin in the liquid phase and reducing the rate of oxidation of the olefin, hence giving lower conversions per unit time.

Intimate contact of the reactants, olefin and molecular oxygen, in the solvent is obtained by various means known to the art, e.g., by stiring, shaking, vibration, spraying, sparging or other vigorous agitation of the reaction mixture.

The olefin feed stocks contemplated herein include pure propylene, mixtures of propylene with other olefins, e.g., ethylene, or olefin stocks containing as much as 50% or more of saturated compounds, e.g., propane. Olefinic feed materials include those formed by cracking hydrocarbon oils, paraffin wax or other petroleum fractions such as lubricating oil stocks, gas oils, kerosenes, naphthas and the like.

The reaction temperatures and pressures are subject only to those limits outside which substantial decomposition, polymerization and excessive side reactions occur in liquid phase oxidations of propylene with molecular oxygen. Generally, temperatures of the order of 160° C. to 250° C. are contemplated. Temperature levels sufficiently high to prevent substantial build-up of any hazardous peroxides which form are important from considerations of safe operation. Preferred temperatures are within the range of from 180 C. to 230° C. Still more preferred operating temperatures are within the range of from 190° C. to 210° C. Suitable pressures herein are within the range of from 0.5 to 350 atmospheres, i.e., subatmospheric, atmospheric or superatmospheric pressures. However, the oxidation reaction is facilitated by use of higher temperatures and pressures, hence, the preferred pressure range is from 5 to 200 atmospheres. Still more preferred pressures are within the range of from 25 to 75 atmospheres. Pressures and temperatures selected will, of course, be such as to maintain a liquid phase.

The oxidation of olefins, e.g., propylene, in the present process is auto-catalytic, proceeding very rapidly after a brief induction period. A typical oxidation of propylene requires from about 0.1 to 20 minutes.

The reaction vessel may consist of a wide variety of materials. For example, aluminum, silver, nickel, almost any kind of ceramic material, porcelain, glass, silica and various stainless steels, e.g. Hastelloy C, are suitable. It should be noted that in the instant process where no added catalyst are necessary, no reliance is made upon the walls of the reactor to furnish catalytic activity. Hence, no regard is given to reactor geometry to furnish large-surface catalytic activity.

The oxidation products are removed from the reactor, preferably, as a combined liquid and gaseous mixture, or the liquid reaction mixture containing the oxidation products is removed to a products separation system, a feature of which comprises in combination a flasher-stripper let-down arrangement. This arrangement in combination with the preceding propylene oxidation reaction and with succeeding product-separation steps constitutes a unique, safe, simple, economic and practical process for the commercial production and recovery of acetic acid.

In regard to the flasher-stripper let-down system, principal advantages accruing from its use are that the system simultaneously (1) utilizes the heat of the oxidation reaction in the initial separation of gaseous and liquid products; this eliminates the need of cooling the reactor effluent, (2) minimizes the amount of total overhead solvent, resulting in a reduced solvent load on subsequent distillation columns. The advantages of this reduced solvent load are that smaller columns are required for the requisite products separations; (3) reduces to trace amounts the quantity of acidic components in solvent recycle streams, and (4) removes the bulk of the fixed gases and very volatile components, thus reducing the pressure requirements to prevent excessive loss of product in subsequent processing steps.

A particular feature of the flasher-stripper let-down combination is that in the flasher an initial separation of about one-third of the acids formed in the reaction is accomplished and these are taken overhead; and by use of a stripping column for treatment of the flasher bottoms, substantially all of the remaining acids, i.e., all but about 0.05 to 0.2 wt. percent based on the recycle stream are removed from the recycle solvent. Advantages afforded by such clean separation of acid values, particularly highly corrosive formic acid, from the recycle solvent are that all equipment for processing the stripper bottoms can now be made of plain inexpensive carbon steel, replacing very expensive corrosion resistant stainless steels such as Hastelloy C, and the like, hitherto required. The economic advantages are manifest.

The total effect of the foregoing advantages is to provide an efficient, rapid economical method for stabilizing the propylene oxidation reaction mixtures while unloading solvent from the oxidation products and recycling solvent to the reactor.

In contrast to the flasher-stripper combination used herein the use of individual flashers or distillation columns in the initial separation of the products from the reactor effluent is inadequate for various reasons. For example, a single flasher cannot simultaneously minimize the quantity of overhead solvent, hence reducing the liquid load in the distillation columns in the separation train, while minimizing the amount of acids in the bottoms stream recycled to the main reactor. If conditions of temperature and pressure in a single flasher are so adjusted as to permit the desired amount of solvent to go overhead, a large amount of acids (15 wt. percent or more) appear in the bottoms stream and are recycled to the reactor.

Further, when a single distillation column is used in the initial gas-liquid separation of reactor effluent this column must be approximately five times as large in cross sectional area as that column used herein into which the combined overhead streams of the flasher and stripper are fed. In feeding the gas-liquid effluent directly into a distillation column a large amount of fixed gases are present, thus reducing plate efficiency and requiring additional plates which materially adds to the cost of operation. A further disadvantage of having large quantities of fixed gases in a distillation column adjacent to the reactor is that much higher pressures and refrigerants (as opposed to cooling water) are required to condense overhead gases.

On the other hand, use of a plurality of distillation or stripping columns to effect an initial gas-liquid separation of the reactor effluent is disadvantageous primarily because of the required increase in product hold-time in these columns. This increased hold-time necessitates longer exposure of distillation equipment to the deleterious action of formic acid and permits undesired secondary reactions of by-products as by hydrolysis, esterification, polymerization or decomposition. In addition, when no flashers are used the total reactor effluent is loaded into these distillation columns thus requiring equipment of increased capacity and separation efficiency. Elimination of a flasher, moreover, increases capital outlay since distillation columns are much more expensive than flashers.

The flasher-stripper let-down combination used herein is in like manner superior to let-down arrangements comprising a plurality of flashers for a number of reasons. Primarily, by use of a flasher-stripper combination greater control and flexibility of process operation is assured, it being much easier to change product separation specifications and operations in a stripper than in a flasher. This is accomplished principally by controlling the heat input to the stripper from a reboiler. Since a flasher has only one equilibrium stage, a stripper magnifies by several stages, depending upon the number and efficiency of plates therein, the degree of separation of products achieved by flashers. A further advantage of using a stripper in place of a second flasher is that the former removes all but a small amount, i.e., approximately 0.05 to 0.2 wt. percent, based on total recycle stream, of formed acids from the recycle solvent, whereas by use of flashers about 1–2 wt. percent of acids remain in the recycle solvent.

Bottoms from the stripper containing the bulk of the solvent and residue, i.e., components having boiling points above that of the solvent, are fed to the top of an absorber to flow downward countercurrently to a stream of uncondensed materials from the flasher and stripper overhead which is fed to a lower region of the absorber.

An important feature of the present process is the controlled oxidation of residue material formed in the main oxidation reactor to increase the yield of acetic acid produced in the process.

The liquid phase oxidation of hydrocarbons results in the production of a complex mixture of oxygenated products. For example, in the present liquid phase oxidation of propylene with molecular oxygen, over forty individual compounds have been identified. In addition to these individual compounds, a residue of polymeric material is also produced. This polymeric material is of complex composition and has not been fully characterized, but is known to contain a variety of functional groups including carboxyl, carbonyl, alkoxy and hydroxy groups.

When this residue is recycled to the main oxidation reactor it is oxidized primarily to acetic acid rather than carbon oxides and water by proper selection of reaction conditions. However, this residue material can be recycled to and utilized in the reaction zone to produce acetic acid only within certain concentration limits, of which the upper limit is critical. The exceeding of this upper limit is delineated by the occurrence of a series of interrelated effects, the first of which is a viscosity effect. Due to the excessive viscosity of the reactor effluent the stripper in the product separation train begins to plug up and soon floods, resulting in a continually decreasing flow of the solvent recycle stream to the oxidation reactor. Concurrent with a reduced solvent recycle flow, the acetic acid yield drops because decreasing amounts of residue, oxidizable to acetic acid, are being returned to the reactor in the recycle solvent. Also, since less recycle solvent and residue are returned to the reactor the concentration of unreacted propylene increases because of decreasing dilution. This, in turn, results in the oxidation of propylene to still more residue to produce still higher viscosities which further interferes with the normal oxygen distribution and prevents the complete oxidation of residue to acetic acid.

As a result of the foregoing series of events when excess residue is present in the reactor, the process soon becomes inoperable.

Therefore, the concentration of residue in the reactor should be maintained at less than 60%, and preferably, from 25% to 50% by weight based on the reaction mixture. The process is operable using concentrations of residue up to about 75%; however, at residue levels above 60% the viscosity of the reaction mixture presents increasing demands on, and decreasing ability of, auxiliary separation equipment to handle the load.

According to the present process, therefore, the concentration of residue in the reactor is controlled by balancing the amount of residue oxidized against the amount of residue formed in the oxidation within the above-defined limits. This control of residue levels in the reactor is a function of a combination of variables, primarily temperature, agitation, residence time and reactant ratios. At steady state the solvent recycle stream is monitored to determine residue level. If the residue level is too high, resulting in the problems described above, this level can be reduced by increasing the degree of agitation and/or decreasing (1) reaction temperatures, (2) reactor residence time or (3) olefin/$O_2$ feed ratios. When either (1), (2) or (3) are done, appropriate adjustments must be made in the other two variables for optimum results. Conversely, if upon monitoring the solvent recycle stream it is found that the residue level is too low for maximum acetic production, the residue level in the reactor can be increased by reversing the above procedures used in decreasing residue levels.

The overhead streams from the flasher and stripper are passed to condensers from which uncondensed materials are combined and fed to an absorber. Condensable materials from the condensers are combined and fed to a primary product splitter from which unreacted propylene and propane are taken overhead to a splitter for these components wherein propylene is removed overhead and recycled to the reactor. Alternatively, the entire overhead from the primary products splitter is processed through an absorber and desorber as discussed below.

From an upper region of the primary products splitter is removed a side stream containing primarily products which, relative to acetic acid, are designated as low boiling components, e.g., propylene oxide, methyl formate, acetaldehyde, acetone, methyl acetate and methanol. This side stream is directed to an acetaldehyde removal column where acetaldehyde is taken overhead and recycled to the main oxidation reactor, while the remaining products are removed as bottoms. The recycled acetaldehyde further increases acetic acid yields based on propylene consumed by oxidation with additional oxygen to acetic acid.

The product acetic acid and other valuable products resulting from the present oxidation process are recovered from the bottoms stream of the primary products splitter referred to above. This bottoms stream contains all of the solvent taken overhead from the flasher-stripper letdown system, acid values, water, low boiling components not removed in the primary products splitter side stream, including methanol, methyl acetate, acetone, isopropanol, allyl alcohol, biacetyl and others; and some higher boiling components, including propylene glycol and various high boiling esters of propylene glycol formed in situ, such as propylene glycol monoacetate, propylene glycol monoformate and propylene glycol acetate formate.

The primary products splitter bottoms containing the above values is passed to a solvent-acid splitter where all higher boiling components including solvent, propylene glycol and esters of propylene glycol are removed as bottoms. The treatment and utility of this bottoms stream is discussed below.

Overhead from the solvent-acid splitter containing all the acid values, all the water and all the low boiling components is passed to an acids-low boiler separation column where the low boilers and a small amount of water are recovered overhead. These low boilers may be separated into fractions suitable for various solvent utilities, e.g., a methanol, methyl acetate, acetone fraction is useful as a paint thinner or as a film casting solvent. Alternatively, these low boilers may be separated into individual components such as those mentioned above by various extraction means such as selective adsorption and fractional desorption, solvent extraction, extractive distillation, azeotropic distillation, etc., using a suitable extractant.

Bottoms from the acids-low boiler separation column containing acetic acid, formic acid and water are passed to an azeotropic distillation column containing benzene. In this column benzene forms azeotropes with water and with formic acid which are taken overhead to a condenser cooled with cooling water. Upon condensing, water and formic acid are cleanly separated from the benzene and collected in a separator from which benzene is recycled to the azeotropic distillation column, while water and formic acid are removed as bottoms from the separator. Bottoms from the azeotropic distillation column comprising primarily acetic acid are passed to an acetic acid refining column from which purified acetic acid is recovered overhead as a final product.

Returning now to the bottoms stream from the solvent-acids splitter; as discussed above, the treatment and utility of this stream constitutes an important aspect of the present invenion. It has been found that various components in this stream, e.g., propylene glycol and various monoesters thereof, particularly propylene glycol monoacetate and monoformate exert deleterious effects upon the course of the reaction in the main oxidation reactor. These deleterious effects are due chiefly to the oxidation of these unstable compounds to undesired oxidation products.

Accordingly, it is a feature of the instant process to convert the disadvantage of the presence of the above deleterious components in the recycle solvent to great advantage. This is accomplished by use of a solvent treating procedure following the solvent-acids splitter column. Bottoms from this column is comprised chiefly, i.e., from about 88–92 weight percent, of the solvent used in the primary oxidation reactor, e.g., propylene glycol diacetate, together with from about 8–12 weight percent of propylene glycol, glycol esters and residue, i.e., polymeric material boiling above the solvent. This stream is fed to an ester concentrator, a distillation column the function of which is to drive the propylene glycol and glycol esters overhead in a stream rich in these components while recycling the bottoms containing residual residue and most of the solvent to the absorber, thence, to the reactor.

The overhead stream from the ester concentrator is combined with acetic acid from the bottoms of the acetic acid refining column and water-formic acid removal column and this combined stream fed to a reactor where the propylene glycol and glycol esters undergo esterification and some transesterification in the presence of an acid catalyst, e.g., toluenesulfonic acid. The effluent stream from the esterification reactor is greatly enriched in the preferred oxidation solvent of this process, viz, propylene glycol diacetate, and substantially depleted of the deleterious components referred to above.

Thus, by means of the solvent treatment operation certain deleterious products of the primary oxidation reaction can be converted to an eminently suitably oxidation solvent. Also, solvent mechanical losses which occur in the process can be made up while at the same time increasing the efficiency and controllability of the oxidation reaction.

The effluent stream from the esterification reactor is fed to a stripping column where the excess acetic acid and a small amount of water, formic acid and other products formed by the esterification and/or transesterification reaction are taken overhead and combined with the overhead from the acid-solvent splitter for further treatment. Bottoms from the stripping column comprise predominantly propylene glycol diesters, the preferred solvents herein, and a small amount of propylene glycol and monoesters. This bottoms stream is returned to the ester concentrator for further treatment as described above.

A preferred specific embodiment of the present invention will be described in connection with the direct oxidation of propylene in a continuous operation and a specific novel method of separating and refining acetic acid formed in the reaction. Suitable variations in the separation trains are also disclosed.

*Example*

In this process a one-liter Magnedrive autoclave serves as the reactor portion of a continuous system. Solvent, propylene and oxygen are introduced through a bottom port directly below a Dispersimax turbine agitator operating at 900 r.p.m. The reactor is heated electrically and temperature control maintained by modulating water flow through internal cooling coils. Reaction temperatures are continuously recorded on a strip-chart.

In operation the reactants, 92% propylene and 99% oxygen, together with propylene glycol diacetate, a preferred solvent, are fed to an oxidation reactor 11 operating at 850 p.s.i.g. and 210° C. The molar feed ratio of $C_3H_6/O_2$ is 0.8. Total hold time is about 8 minutes. A variation is to provide two or more reactors in parallel operating under identical conditions and feeding the effluent from these reactors into the flasher-stripper let-down system described below.

The reaction product, a combined gas-liquid effluent, is fed continuously through line 12 to a flasher 13, which operated at 165 p.s.i.a. pressure and 190° C. at the bottom and 170° C. at the top. From this flasher most of the low boiling components including all unreacted propylene, $CO_2$ and at least one-half, and in this example approximately 60%, of the other low boilers goes overhead along with about one-fourth of the acids, e.g., formic and acetic acids, all dissolved gases and about 6–8% of solvent. Bottoms from the flasher are fed through line 17 to a stripping column 18, operating at approximately 24.7 p.s.i.a. and 200° C. at the bottom and using 6 distillation plates. The residual low boilers, i.e., generally between 40% and 50% of that formed, and about 33% in this example, substantially all of the remaining acids, lighter components and 10–15% of the solvent are vaporized and taken overhead. Bottoms from the stripper containing the bulk of the solvent are fed through line 19 to an absorber 20. The solvent effluent from the stripper contains about 55% by weight of residue, i.e., reaction products having boiling points above that of the solvent.

Overhead from the flasher and stripper are directed to partial condensers 15 and 14, respectively, operating with cooling water. In the flasher condenser 15, uncondensables, including fixed gases, most of the $CO_2$, about 7% of the total low boilers, about 74% of the unreacted propylene, and propane are separated from the condensables and fed through line 16 countercurrently to the solvent bottoms from the stripper to the absorber. The uncondensables from the stripper condenser 14, containing $CO_2$, propane and propylene are either discarded if desired or, optionally compressed in compressor 24 and fed to the absorber 20, to recover the propylene. The absorber is operated at 150 p.s.i.g. and at temperatures of approximately 75° C. at the top and 95° C. at the bottom and has twenty-five plates. Fixed gases, $O_2$, $H_2$, $N_2$, $CH_4$, CO and $CO_2$ are vented from the top of the absorber through line 21. Propane, propylene, and other soluble components are absorbed in the solvent which is recycled to the reactor through line 44 or, alternatively, further processed for propylene purification, as will be discussed below.

The condensed liquids from the stripper condenser are combined through line 22 with those from the flasher condenser in line 23 and this combined stream 25 containing 95% of the formed low boilers, most of the acids and about 20% of the solvent is fed to a primary products splitter, 26, a distillation column containing 40 plates and operating at about −16° C. at the top and 145° C. at the bottom under 40 p.s.i.a. pressure and a reflux ratio of 6.0.

Unreacted propylene and propane are taken overhead from the primary products splitter through line 29 to a splitter, 30, for these components wherein propane is removed as bottoms and propylene is removed overhead through line 35 and recycled to the reactor. The propylene-propane splitter, 30, has 75 plates and operates at 300 p.s.i.a. and is heated to 50° C. at the top and 55° C. at the bottom and uses a reflux ratio of 11.7. If desired some propane may be driven overhead by increasing the temperature at the bottom of the splitter.

An alternative procedure for removing propane from recycle propylene is to combine the overhead from the primary products splitter with the overhead stream from the condensers leading to the absorber. As mentioned previously, the liquid bottoms from the absorber containing solvent, propylene and propane may be recycled directly to the reactor or further processed for propylene purification, i.e., propane removal. When the concentration of propane in the reactor tends to build up to a level which interferes with the propylene oxidation, additional, or excess, propane is prevented from being recycled to the reactor by directing the effluent bottoms from the absorber, wholly or partially, through a side-stream taken from the absorber bottoms stream, by means of a distributing valve into a desorber operated at about 50° C. at the top and 100° C. at the bottom and 300 p.s.i.a. pressure. Here, solvent is removed as bottoms and recycled to the reactor and propane and propylene are removed overhead to a $C_3H_6$–$C_3H_8$ splitter operating at 300 p.s.i.a. and heated to about 50° C. at the top and 55° C. at the bottom. Propane is removed as bottoms and propylene of essentially the same composition as the initial feed material is recycled to the reactor propylene feed stream.

From the primary products splitter, 26, a side stream, 27, is removed at about the fifth plate from the top of the column. This side stream is directed to an acetaldehyde removal column, 28, where acetaldehyde is removed overhead and recycled through line 36 to the main oxidation reactor, while the other low boilers are removed as bottoms through line 31. This bottoms stream can be suitably separated into fractions useful in various solvent applications or further separated into individual components if desired. The acetaldehyde removal column is heated to about 22° C. at the top and 60° C. at the bottom and maintained at 15 p.s.i.a. pressure. This column has 70 plates and uses a reflux ratio of 6.0.

Turning now to the recovery of the acetic acid product and other valuable oxygenated by-products, reference is made to the bottoms stream, 50, from the primary products splitter, 26, described above. This stream contains all of the solvent taken overhead from the flasher-stripper let-down system, acid values, water, low boiling components not removed in the primary products splitter side stream, including methanol, methyl acetate, acetone, isopropanol, allyl alcohol, biacetyl and others, various high boiling components including acetonyl acetate, propylene glycol and various esters thereof such as propylene glycol monoacetate, propylene glycol monoformate and propylene glycol acetate, formate and a small amount of residue. This stream is fed to a solvent-acids splitter, 51. From this column, which has 10 plates and operates at about 105° C. at the top and 192° C. at the bottom under 15 p.s.i.a. pressure and using a reflux ratio of 3, all of the solvent and high boiling components are removed as bottoms through line 52 and fed to a solvent treater system which is described below. The overhead product from the solvent-acids splitter containing all acid values, all the water and all the low boiling components is passed through line 53 to an acids-low boilers separation distillation column, 54, where the low boiling components, a small amount of water and traces of high boilers are recovered overhead through line 55. This column utilizes 60 plates and operates at about 88° C. at the top and 116° C. at the bottom under 15 p.s.i.a. pressure and a reflux ratio of 8.0.

Bottoms from this column containing about 74% acetic acid, about 8.5% formic acid, about 6.5% water and traces of other components are directed through line 56 to an azeotropic distillation column, 57, containing about 70 trays and operating at about 77° C. at the top and 125° C. at the bottom under 15 p.s.i.a. pressure. Benzene is used as an azeotrope-former and is fed through line 61 to the column at a point above the top tray at a ratio of 9 parts by weight of benzene for each part of overhead product from the column. Uniquely, in this system benzene forms two distinct azeotropic mixtures; one with water and one with formic acid, rather than a ternary azeotrope of these three components. In operation, a benzene-water azeotrope and a benzene-formic acid azeotrope are removed overhead through line 58 to a condenser (circulating water) 75. Upon condensing, a mixture of benzene, water and formic acid are passed through line 76 to a collector, 59, wherein the mixture separates into an upper benzene phase and a lower phase containing about 42% water, 55% formic acid and about 3% acetic acid. The latter components are removed from the bottom of the collector while benzene from the upper phase (replenished with make-up benzene through line 60) is recycled through line 61 to the azeotropic distillation column.

Meanwhile, acetic acid is removed through line 62 as the bulk of the bottoms (over 86 weight percent) from this column together with small amounts of the higher boiling components to an acetic acid refining column, 63, having 40 trays and operating at about 118° C. at the top and 130° C. at the bottom under 15 p.s.i.a. pressure and a reflux ratio of 5.0. Purified acetic acid is recovered overhead through line 65.

Returning now to the bottoms stream 52 from the solvent-acids splitter 51; this stream contains about 90% propylene glycol diesters, mainly the diacetate (about 88%) and a small amount of acetate formate (about 2%); and the balance primarily propylene glycol and its monoesters, propylene glycol monoacetate and monoformate together with a small amount of acetonyl acetate and residue. This stream is fed to an ester concentrator distillation column 66 having 50 trays and operating at temperatures of 186° C. at the top and 195° C. at the bottom and using a reflux ratio of 7.0. Bottoms from this column contain over 97% of the propylene glycol diesters useful as solvents in the oxidation reaction and the balance essentially residue. This stream 72 is combined with the bottoms 19 from the stripper 18 and fed to the absorber 20 and then recycled to the oxidation reactor 11 by way of the absorber bottoms 44. This absorber bottoms stream contains about 50% by weight of residue upon entering the reactor. Under the conditions of reaction in this embodiment the amount of residue oxidized is balanced against the amount of residue formed in the reaction to maintain a relatively constant residue level in the reactor.

The overhead from the ester concentrator column, concentrated to about 20% by weight with oxidatively unstable propylene glycol, its monoesters and acetonyl acetate, is fed through line 67 to an esterification reactor 68 for acid-catalyzed (toluenesulfonic acid) esterification and transesterification of the above components to useful propylene glycol diesters. Other suitable acid catalysts for this esterification reaction include naphthalenesulfonic acid and xylenesulfonic acid. Before entering the esterification reactor the overhead stream 74 is combined with a stream consisting of a mixture of the bottoms stream 64 from the acetic acid refining column and a side stream 77 from the bottoms 62 of the water-formic acid removal column 57, thus assuring an excess of acetic acid for the esterification reaction. This combined stream now contains about 61% of propylene glycol diesters, about 17% of the above mentioned unstable components and residue, about 21% acetic acid and the balance unidentified high boilers. This stream is then fed to the esterification reactor operated at 170° C. under 15 p.s.i.a. pressure. Upon completion of the reaction the effluent stream 69 contains about 70% of useful propylene glycol diesters (an increase of about 14 wt. percent of the amount fed to the reactor), about 6% of acetonyl acetate, propylene glycol and its monoesters (a decrease of about 62 wt. percent of the amount fed to the reactor), about 18% of acetic acid and the balance esterification by-products and stable high boilers.

The effluent stream 69 from the esterifier is fed to a solvent stripping column 70 having 20 plates and operating at 150° C. at the top and 200° C. at the bottom under 25 p.s.i.a pressure and using a reflux ratio of 7.0. The overhead from this stripper, containing over 77% acetic acid, about 6% water and small amounts of formic acid, lower and higher boiling components is fed through line 71 to the acid-low boiler separation column 54 for further treatment, while the bottoms from the solvent stripper, enriched to about 92% of useful solvent diesters and the balance unstable components is recycled through line 73 to the ester concentrator 66 for conversion of the unstable components to stable solvent species and recycling of these useful stable solvent species to the absorber and, finally, the reactor.

In a typical oxidation according to the present embodiment feed materials are added to the main oxidation reactor at approximately the following hourly rates: propylene, 575 g., oxygen, 700 g. and solvent (e.g., propylene glycol diacetate), 4,600 g. At steady state (reactor residence time about 8.0 minutes) propylene conversion is about 50% and oxygen conversion 99.95%. Acetic acid is obtained in about 40 mole percent yield based on propylene reacted, together with minor amounts of other oxygenated products.

While the invention has been specifically described with reference to the oxidation of propylene and recovery of acetic acid and other valuable oxygenated products, it is within the purview of the invention to utilize the above-described and illustrated system for the oxidation of other olefinic compounds to carboxylic acids and recovery thereof, together with associated oxygenated products similarly as described above. It being understood that process conditions, e.g., temperatures and pressures in the reactor, flasher, stripper, columns, etc. will be modified accordingly to make the necessary separations.

Other olefins suitable for use herein preferably include those of the ethylenic and cycloethylenic series up to 8 carbon atoms per molecule, e.g., ethylene, propylene, butenes, pentenes, hexenes, heptenes and octenes; cyclobutenes, cyclopentenes, cyclohexenes, cyclooctenes, etc. Of particular interest, utility and convenience are acyclic olefins containing from 2 to 8 carbon atoms. Included are the alkyl-substituted olefins such as 2-methyl-1-butene, 2-methyl-2-butene, 2-methyl-propene, 4-methyl-2-pentene, 2,3-dimethyl-2-butene and 2-methyl-2-pentene. Other suitable olefinic compounds include dienes such as butadiene, isoprene, other pentadienes and hexadienes; cyclopentenes, cyclohexenes, cyclopentadiene, vinyl-substituted cycloalkanes and benzenes, styrene, methylstyrene, and other vinyl-substituted aromatic systems.

It is to be understood that the foregoing detailed description is merely illustrative of the invention and that many variations will occur to those skilled in the art without departing from the spirit and scope of this invention.

We claim:
1. Process for the production of acetic acid which comprises oxidizing propylene feedstocks with molecular oxygen in a solvent selected from the group consisting of fully esterified polyacyl esters of polyhydroxyalkanes, polyhydroxy-cycloalkanes, polyglycols and mixtures thereof, and the acyl moieties in said esters are derived from acids selected from the group consisting of alkanoic acids having from 1 to 18 carbon atoms, cyclopentane carboxylic acid, cyclohexane carboxylic acid and benzoic acid, and the alkylene and cycloalkylene moieties in said esters contain from 2 to 18 carbon atoms, under temperatures and pressures sufficient to cause the reaction to proceed in the liquid phase and recovering said acetic acid by:

(a) directing an effluent stream of the reaction mixture from a reaction zone through a combination zone comprising a flashing zone followed by a stripping zone, said flashing zone and stripping zone being maintained at pressures substantially lower than in each preceding zone and at temperatures necessary to separate substantially all of the acetic acid and lower boiling products overhead as gas phase and higher boiling components including the bulk of the solvent and polymeric residue which are removed as bottoms from said stripping zone, (b) passing said overhead gas phase to condensing zones, from whence uncondensed gases are directed to an absorbing zone into which the bottoms stream from said stripping zone is also passed to absorb uncondensed propylene, propane and minor amounts of oxygenated components; removing vent gases overhead from said absorber, while feeding the bottoms stream from said absorbing zone back to said reaction zone, (c) adjusting reaction conditions in such manner that at steady state the polymeric residue concentration in said reaction zone is maintained substantially constant at between 25 and 50 weight percent based on the reaction mixture by balancing the amount of polymeric residue oxidized against the amount of polymeric residue formed, said polymeric residue concentration not exceeding the level at which any additional polymeric residue is completely oxidized, (d) feeding a combined stream of condensed liquids from said condensing zones into a primary products splitting zone from which an overhead stream containing propylene and propane are removed to a splitter for these components, the propane being removed as bottoms while propylene is removed overhead and recycled to said reaction zone, (e) directing a sidestream from said primary products splitting zone to an acetaldehyde removal zone from which acetaldehyde is removed overhead and recycled to said reaction zone and from which a bottoms stream containing methyl acetate, methyl formate, acetone, methanol, propylene oxide and other low boilers is removed, (f) feeding the bottoms from said primary products splitting zone to an acid-solvent splitting zone wherein substantially all of the solvent and higher boiling components are removed as bottoms and substantially all acid values, water and low boilers formed in said reaction zone are removed overhead, (g) feeding the overhead from step (f) to an acids-low boilers separation zone wherein the low boiling components are recovered overhead, while directing the bottoms containing said acid values and water from said acid-low boilers distillation zone to an azeotropic distillation column using benzene as an azeotrope-former for water and formic acid, (h) removing from said azeotropic distillation zone an overhead stream containing a mixture of benzene-water and benzene-formic acid azeotropes to a condensing zone wherein benzene is separated from water and formic acid and feeding these three components to a collecting zone in which benzene forms an upper phase from which benzene is returned to said azeotropic distillation zone, while water and formic acid are removed as bottoms, while removing from said azeotropic distillation zone a bottoms stream containing acetic acid to a refining zone wherein purified acetic acid is recovered overhead, (i) feeding the bottoms from said acid-solvent splitter in step (f) containing major amounts of solvent from said reaction zone, minor amounts of propylene glycol and monoesters thereof to an ester concentration zone from which some of said solvent substantially depleted of said propylene glycol and its monoesters is removed as bottoms and recycled to said reaction zone, while removing an overhead stream comprised of the rest of said solvent now enriched with said propylene glycol and its monoesters, (j) feeding the overhead from said ester concentration zone, together with monocarboxylic acid values to an esterification zone wherein propylene glycol and its monoesters are esterified to propylene glycol diesters, (k) feeding an effluent stream from said esterification zone comprising increased amounts of said diesters and decreased amounts of said acid values to a solvent stripping zone wherein said acid values are removed overhead and recycled to said acids-low boilers separation zone in step (g) and said diesters are removed as bottoms and recycled to said ester concentration zone.

2. Process according to claim 1 wherein said solvent comprises a vicinal diacyl ester of a polyhydroxyalkane.

3. Process according to claim 2 wherein said solvent comprises propylene glycol diacetate.

4. Process according to claim 1 wherein said oxidation occurs at temperatures within the range of from 160° to 250° C. and pressures within the range of from 0.5 atmosphere to 350 atmospheres.

5. Process according to claim 4 wherein said oxidation occurs in the absence of added catalysts.

References Cited

UNITED STATES PATENTS

| 1,534,752 | 4/1925 | Watson | 260—488 |
| 1,813,636 | 7/1931 | Petersen | 202—42 |
| 2,224,984 | 12/1940 | Potts et al. | 202—53 |
| 2,627,489 | 2/1953 | Drake et al. | 260—488 |
| 2,985,668 | 5/1961 | Shingu | 260—533 |
| 3,071,601 | 1/1963 | Aries | 260—533 |

LORRAINE A. WEINBERGER, *Primary Examiner.*

RICHARD K. JACKSON, *Examiner.*

VIVIAN GARNER, *Assistant Examiner.*